(12) United States Patent
Lee et al.

(10) Patent No.: US 8,963,798 B2
(45) Date of Patent: Feb. 24, 2015

(54) DISPLAY CONTROLLER, METHOD FOR OPERATING THE DISPLAY CONTROLLER, AND DISPLAY SYSTEM HAVING THE DISPLAY CONTROLLER

(75) Inventors: Dong Han Lee, Seongnam-si (KR); Jong Ho Roh, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1045 days.

(21) Appl. No.: 13/028,491

(22) Filed: Feb. 16, 2011

(65) Prior Publication Data

US 2011/0242412 A1    Oct. 6, 2011

(30) Foreign Application Priority Data

Mar. 30, 2010 (KR) .................. 10-2010-0028272

(51) Int. Cl.
*G09G 5/12* (2006.01)
*G06F 3/14* (2006.01)

(52) U.S. Cl.
CPC ............ *G06F 3/1438* (2013.01); *G06F 3/1446* (2013.01); *G09G 5/12* (2013.01)
USPC ............. 345/1.1; 345/1.3; 345/204; 345/502; 715/761; 348/14.07; 348/588

(58) Field of Classification Search
CPC .... G09G 5/12; H04N 13/0051; G06F 3/1423; G06F 1/1647; G06F 5/44591
USPC ......... 345/1.1, 1.3, 204, 502; 348/14.07, 588; 715/761
See application file for complete search history.

(56) References Cited

U.S. PATENT DOCUMENTS

| 7,365,704 B2* | 4/2008 | Wang et al. ..................... 345/1.2 |
| 2006/0107616 A1* | 5/2006 | Ratti et al. ..................... 52/750 |
| 2007/0103382 A1* | 5/2007 | Chang et al. .................... 345/1.1 |
| 2007/0222774 A1* | 9/2007 | Foster ........................... 345/204 |
| 2010/0134384 A1* | 6/2010 | Kim et al. ...................... 345/1.3 |

FOREIGN PATENT DOCUMENTS

KR     20070096914 A    10/2007

* cited by examiner

*Primary Examiner* — Abbas Abdulselam
*Assistant Examiner* — Shawna Stepp Jones
(74) *Attorney, Agent, or Firm* — Harness, Dickey & Pierce, P.L.C.

(57) ABSTRACT

The display controller includes a decoder, a control circuit, and a video output logic circuit. The decoder is configured to decode a first display command and output a decoding signal and first synchronizing information indicating the first display command is received. The control circuit is configured to generate a first control signal based on second synchronizing information and the decoding signal. The second synchronizing information is output from a second display controller and indicates a second display command is received. The video output logic circuit is configured to send a part of video data stored in a video source and a plurality of first timing control signals for displaying the part of the video data on a display to the display based on the first control signal.

18 Claims, 14 Drawing Sheets

DISPLAY CONTROLLER, METHOD FOR OPERATING THE DISPLAY CONTROLLER, AND DISPLAY SYSTEM HAVING THE DISPLAY CONTROLLER

CROSS-REFERENCE TO RELATED APPLICATIONS

This application claims priority under 35 U.S.C. §119 to Korean Patent Application No. 10-2010-0028272 filed on Mar. 30, 2010, the disclosure of which is hereby incorporated by reference in its entirety.

BACKGROUND

Embodiments of the present inventive concept relate to a display controller, and more particularly, to a display controller, a method for operating the display controller and a display system including the display controller.

A display controller may control a video image displayed on a display by using a plurality of timing control signals.

SUMMARY

One present general inventive concept provides, when video data output from a video source is divided into plural and divided video data are displayed on each of a plurality of displays, a display controller synchronizing timing control signals supplied to each of the plurality of displays, a method for operating the display controller, and/or a display system including the display controller.

The display controller includes a decoder, a control circuit, and a video output logic circuit. The decoder is configured to decode a first display command and output a decoding signal and first synchronizing information indicating the first display command is received. The control circuit is configured to generate a first control signal based on second synchronizing information and the decoding signal. The second synchronizing information is output from a second display controller and indicates a second display command is received. The video output logic circuit is configured to send a part of video data, stored in a video source, and a plurality of first timing control signals for displaying the part of the video data on a display to the display.

The control circuit is configured to generate a second control signal according to a result of comparing a start time-point of a first signal among the plurality of first timing control signals with a start time-point of a second signal among a plurality of second timing control signals generated by the second display controller. The video output logic circuit is configured to control the start time-point of the first signal in response to the second control signal.

Each of the first signal and the second signal is a vertical synchronizing signal, a horizontal synchronizing signal, a data enable signal or a video clock signal.

An embodiment of the present invention is directed to a display system, including a first display controller and a second display controller. The first display controller is configured to control an operation of a first display and output first synchronizing information indicating that a first display command is received. The second display controller is configured to control an operation of a second display and output second synchronizing information indicating that a second display command is received.

The first display controller is configured to output a plurality of first timing control signals for controlling an operation of the first display in response to the first display command and the second synchronizing information. The second display controller is configured to output a plurality of second timing control signals for controlling an operation of the second display in response to the second display command and the first synchronizing information.

The plurality of first timing control signals include a first vertical synchronizing signal or a first horizontal synchronizing signal, the plurality of second timing control signals include a second vertical synchronizing signal or a second horizontal synchronizing signal, the first vertical synchronizing signal and the second vertical synchronizing signal are synchronized to each other, and the first horizontal synchronizing signal and the second horizontal synchronizing signal are synchronized to each other.

The first display controller includes a first decoder configured to decode the first display command and output a first decoding signal and the first synchronizing information, a first detector configured to detect the second synchronizing information, a first signal generator configured to output a first control signal in response to the first decoding signal and an output signal of the first detector, and a first video output logic circuit configured to output a first part of video data stored in a video source and the plurality of first timing control signals to the first display in response to the first control signal.

The second display controller includes a second decoder configured to decode the second display command and output a second decoding signal and the second synchronizing information, a second detector configured to detect the first synchronizing information, a second signal generator configured to output a second control signal in response to the second decoding signal and an output signal of the second detector, and a second video output logic circuit configured to output a second part of the video data stored in the video source and the plurality of second timing control signals to the second display in response to the second control signal.

The first decoder and the second decoder may be embodied in a Special Function Register (SFR), respectively.

The display system further includes a video source for storing the video data, which corresponds to a frame.

The first display controller is configured to send the plurality of first timing control signals with the first part of the video data to the first display so as to display the first part of the video data as a frame on the first display, and the second display controller is configured to send the plurality of second timing control signals with the second part of the video data to the second display so as to display the second part of the video data as a frame on the second display.

Each of the first display controller and the second display controller is configured to compare a start time-point of a first signal among the plurality of first timing control signals with a start time-point of a second signal among the plurality of second timing control signals and adjust the start time-point of the first signal and the start time-point of the second signal according to a comparison result.

Each of the first signal and the second signal is a vertical synchronizing signal, a horizontal synchronizing signal, a data enable signal or a video clock signal.

In a further embodiment, the display system includes a plurality of display controllers. Each display controller is configured to output synchronizing information and control operation of a corresponding display based on the synchronizing information output from at least one other of the display controllers.

An embodiment of the present invention is directed to a method for operating a display controller, including decoding a first display command, outputting a decoding signal and a first synchronizing information indicating the first display command is received, generating a control signal based on the decoding signal and second synchronizing information, which is output from a second display controller and indicates a second display command is received, and sending a part of video data stored in a video source and a plurality of timing control signals for displaying a part of the video data on a display to the display in response to the control signal.

An embodiment of the present invention is directed to a method for operating a display system, which includes a first display controller and a second display controller, the first display controller for controlling an operation of a first display and outputting a first synchronizing information indicating that a first display command is received, the second display controller for controlling an operation of a second display and outputting a second synchronizing information indicating that a second display command is received, the method including outputting, by the first display controller, a first timing control signal for controlling an operation of the first display to the first display in response to the first display command and the second synchronizing information, and outputting, by the second display controller, a second timing control signal for controlling an operation of the second display to the second display in response to the second display command and the first synchronizing information.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE EXAMPLE EMBODIMENTS

Figure 1:
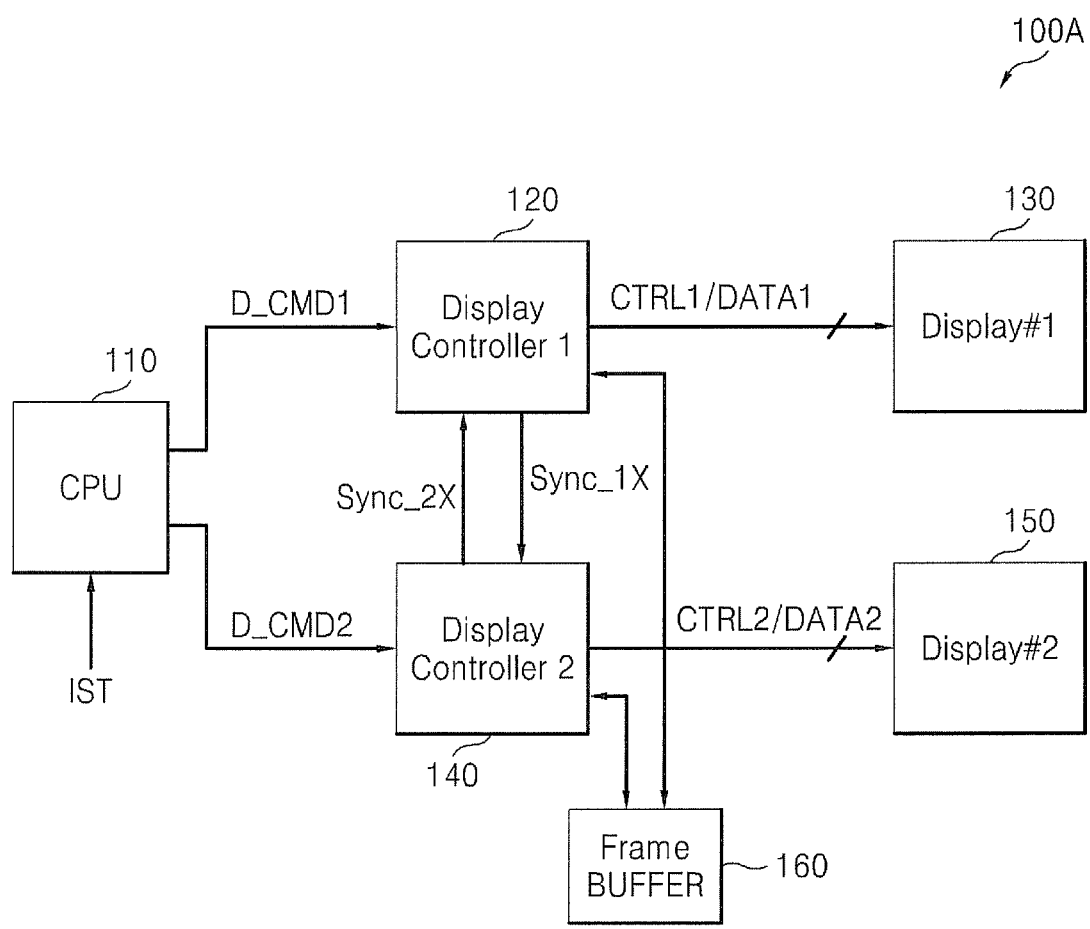
FIG. 1 shows a schematic block diagram of a display system according to an example embodiment of the present invention.

Example embodiments of the present invention now will be described more fully hereinafter with reference to the accompanying drawings, in which example embodiments of the invention are shown. The invention may, however, be embodied in many different forms and should not be construed as limited to the example embodiments set forth herein. Rather, the example embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements that may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 shows a schematic block diagram of a display system according to an example embodiment of the present invention. For convenience of explanation, two displays 130 and 150 and two display controllers 120 and 140 are illustrated in FIG. 1, however, a display system 100A may include N displays and N display controllers, where N is a natural number, according to an example embodiment of the present invention. Each of the N display controllers may control an operation of each of the N displays and communicate with each other to synchronize timing control signals output to each of the N displays.

Referring to FIG. 1, the display system 100A includes a CPU 110, a first display controller 120, a first display 130, a second display controller 140, a second display 150 and a frame buffer 160.

The CPU 110 controls a display operation of the display system 100A. The CPU 110 may control an operation of a first display controller 120 and an operation of a second display controller 140 according to a display mode change command IST input by a user.

Figure 8:
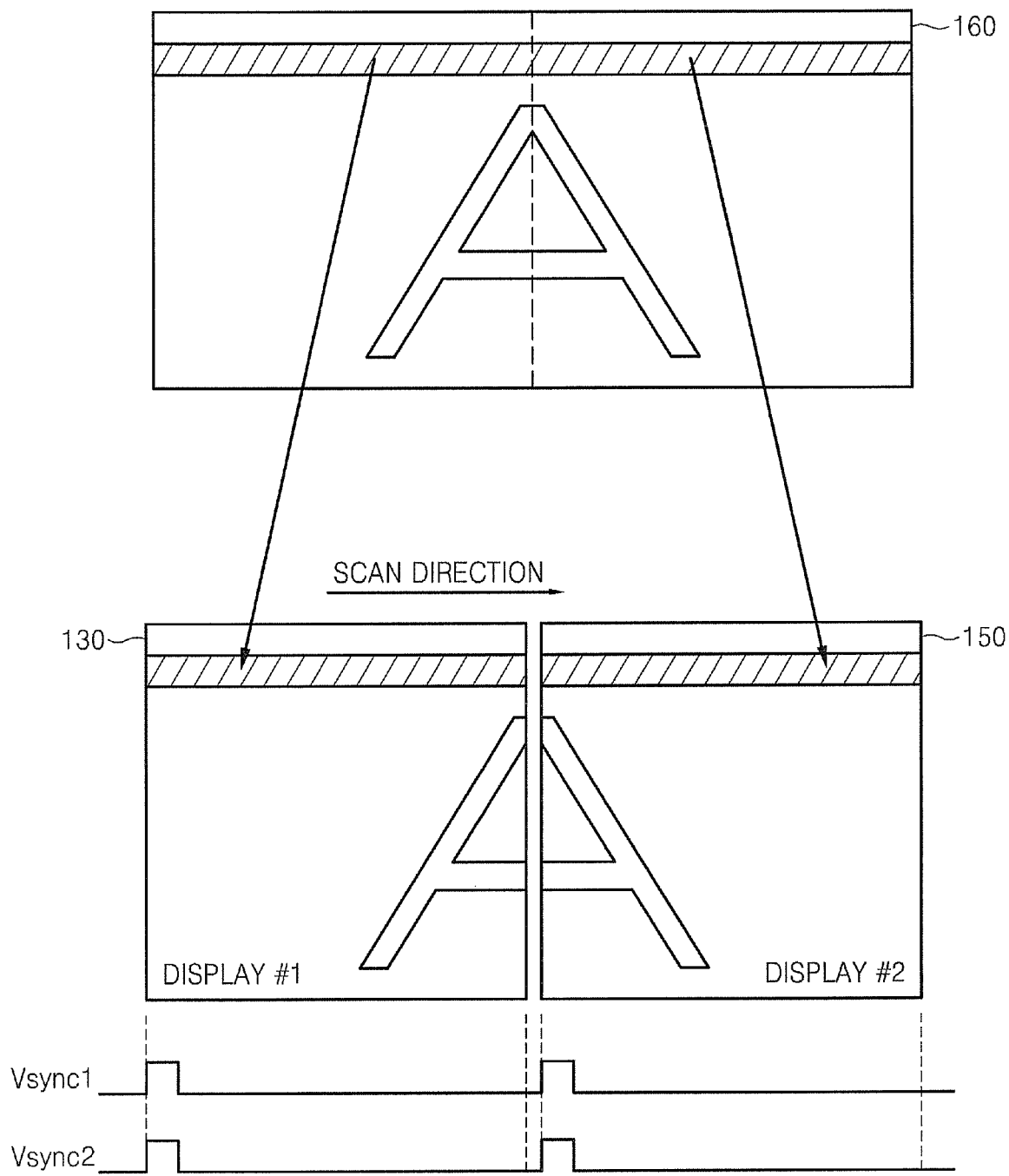
FIG. 8 shows video data displayed on two displays according to a line split mode.
Figure 9:
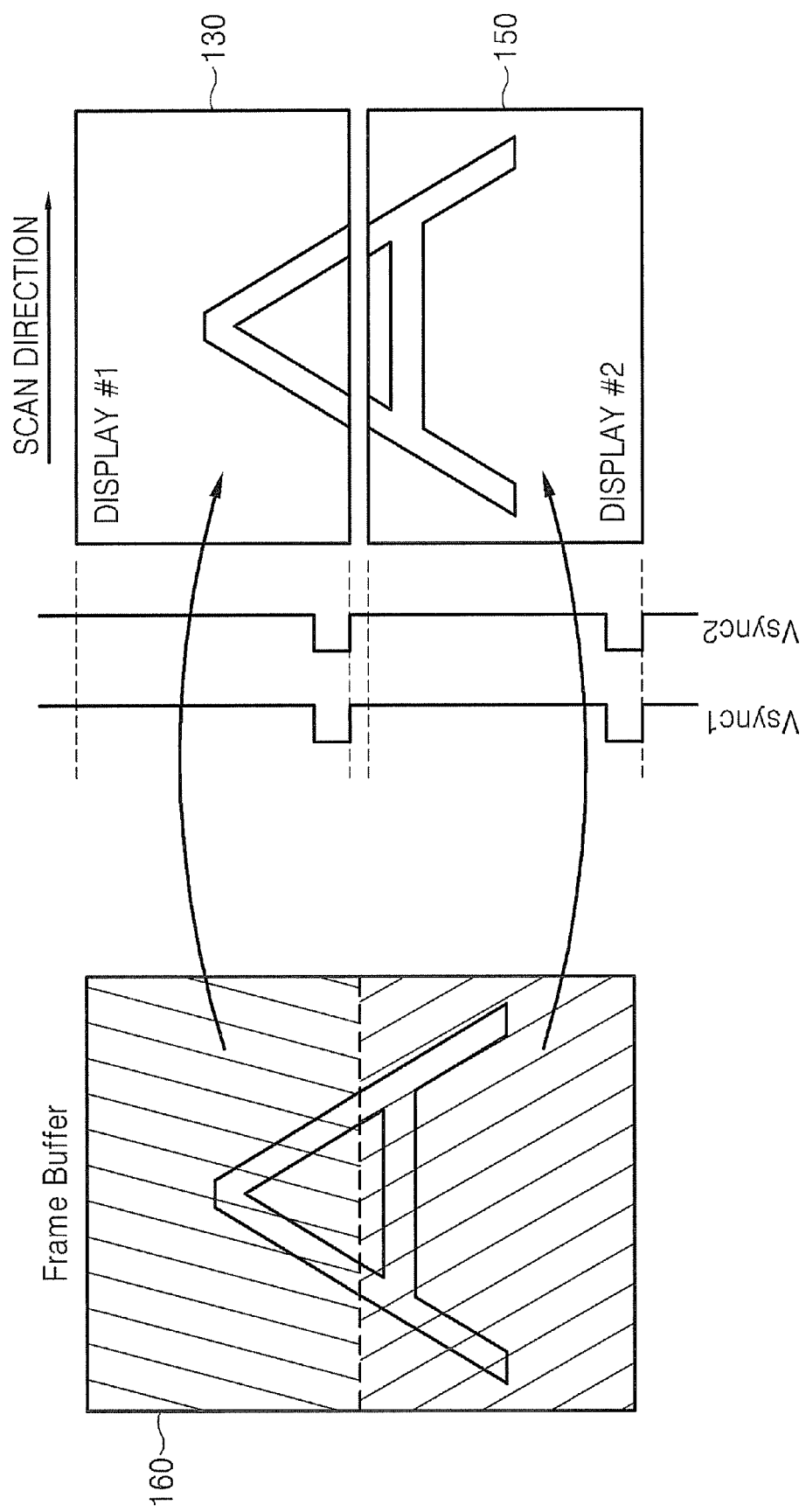
FIG. 9 shows video data displayed on two displays according to a frame split mode.

Here, the display mode change command IST is a command for dividing and displaying a video data corresponding to a frame stored in a video source, e.g., a frame buffer 160, on two displays 130 and 150, for example, as described in FIGS. 8 and 9.

Accordingly, before a display mode change command IST is input, each display 130 or 150 may display a different video image under a control of each display controller 120 or 140.

The display system 100A may divide the video data into plural video data according to a display mode change command IST and display each video data divided into plural video data as a frame by using each display. This is called a multi display operation.

For example, the CPU 110 may decode or analyze a display mode change command IST and generate a first display command D_CMD1 and a second display command D_CMD2 according to a result of decoding or analysis. In this case, the CPU 110 may generate the second display command D_CMD2 after generating the first display command D_CMD1. On the contrary, the CPU 110 may generate the first display command D_CDM1 after generating the second display command D_CMD2.

The first display controller 120, so as to display a part of video data (hereinafter, 'a first video data') stored in a frame buffer 160 according to, for example, a line split mode of FIG. 8 or a frame split mode of FIG. 8, may output a plurality of first timing control signals CTRL1 with a first video data DATA1 to a first display 130 according to the first display command D_CMD1 and a second synchronizing information Sync_2x output from a second display controller 140. The first video data DATA1 forms a frame on the first display 130.

Here, the second display controller 140 may generate a second synchronizing information Sync_2X in response to a second display command D_CMD2 and output generated second synchronizing information Sync_2X to the first display controller 120.

The second display controller 140, so as to display a rest part of the video data (hereinafter: 'a second video data') stored in the frame buffer 160 according to, for example, a line split mode of FIG. 6 or a frame split mode of FIG. 7, may output a plurality of second timing control signals CTRL2 with a second video data DATA2 to a second display 150 according to a second display command D_CMD2 and a first synchronizing information Sync_1X output from the first display controller 120. The second video data DATA2 forms a frame on the second display 150.

Here, the first display controller 120 generates a first synchronizing information Sync_1X in response to the first display command D_CMD1 and outputs generated first synchronizing information Sync_1X to the second display controller 140. That is, the first display controller 120 may transmit a first video data DATA1 to the first display 130 in response to a first display command D_CMD1 and a second synchronizing information Sync_2X, and the second display controller 140 may transmit a second video data DATA2 to the second display 150 in response to a second display command D_CMD2 and a first synchronizing information Sync_1X.

Accordingly, a video image corresponding to a frame displayed on the first display 130 and a video image corresponding to a frame displayed on the second display 150 correspond to each other as illustrated in FIG. 8 or 9. Here, corresponding means two video images displayed on two displays 130 and 150 are just like a video image displayed on a display.

A size, resolution or an operating frequency of each of the first display 130 and the second display 150 may be equal to each other or not.

However, the first display controller 120 and the second display controller 140 may exchange synchronizing information Sync_1X and Sync_2X with each other, so that each display controller 120 or 140 may output respective timing control signals synchronized. A frame buffer 160, an example of a video source, may store video data by frame.

Figure 2:
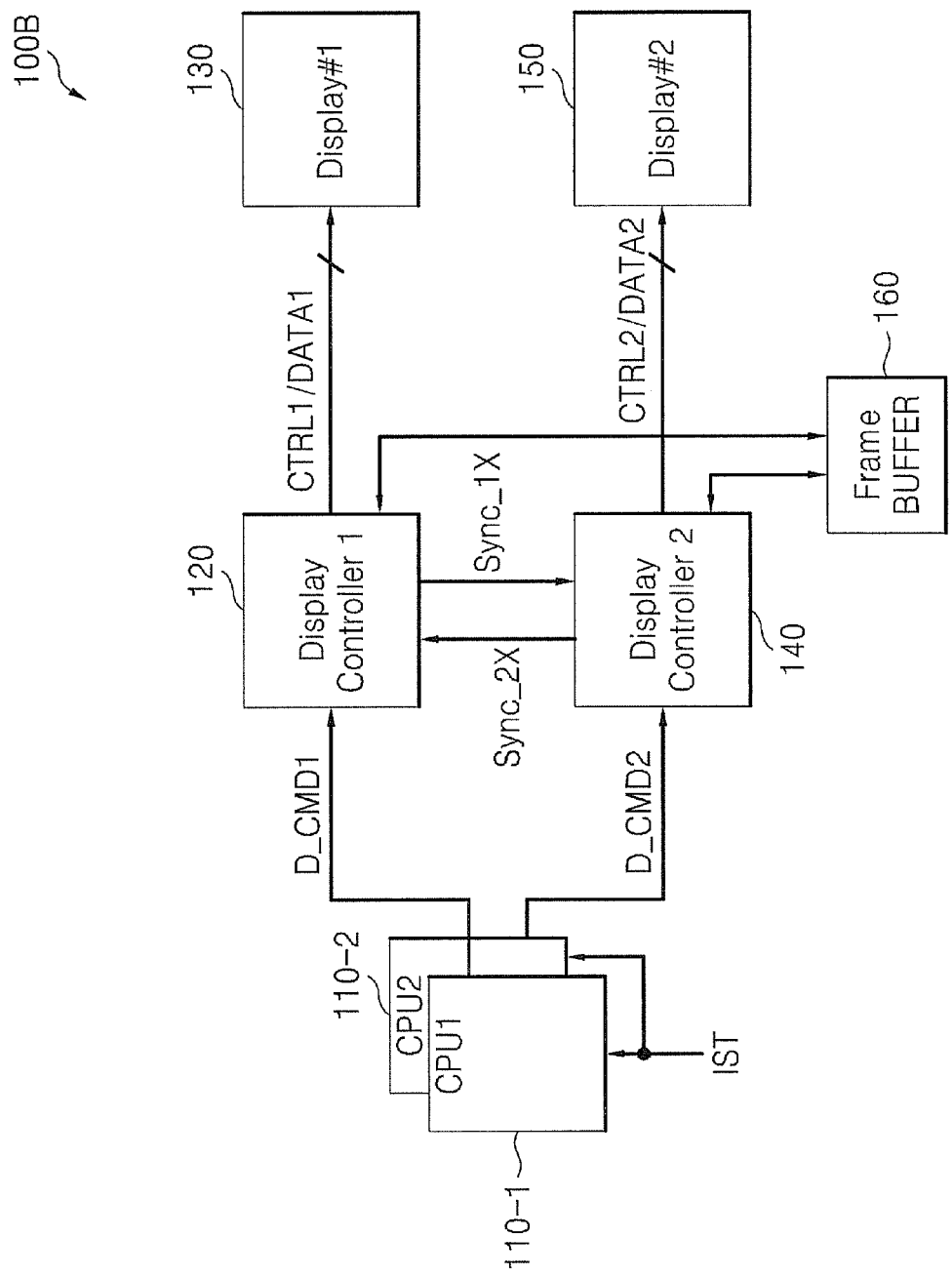
FIG. 2 shows a schematic block diagram of a display system according to another example embodiment of the present invention.

FIG. 2 shows a schematic block diagram of a display system according to another example embodiment of the present invention. Referring to FIG. 2, a display system 100B includes two CPUs 110-1 and 110-2 differently from the display system 100A illustrated in FIG. 1.

A first CPU 110-1 controls an operation of the first display, controller 120, and a second CPU 110-2 controls an operation of the second display controller 140.

For example, each CPU 110-1 or 110-2 generates display command D_CMD1 or D_CMD2, respectively, in response to a display mode change command IST. Each display command D_CMD1 or D_CMD2 may be output to each display controller 120 or 140 simultaneously or at a desired (or, alternatively a) predetermined time interval.

Figure 3:
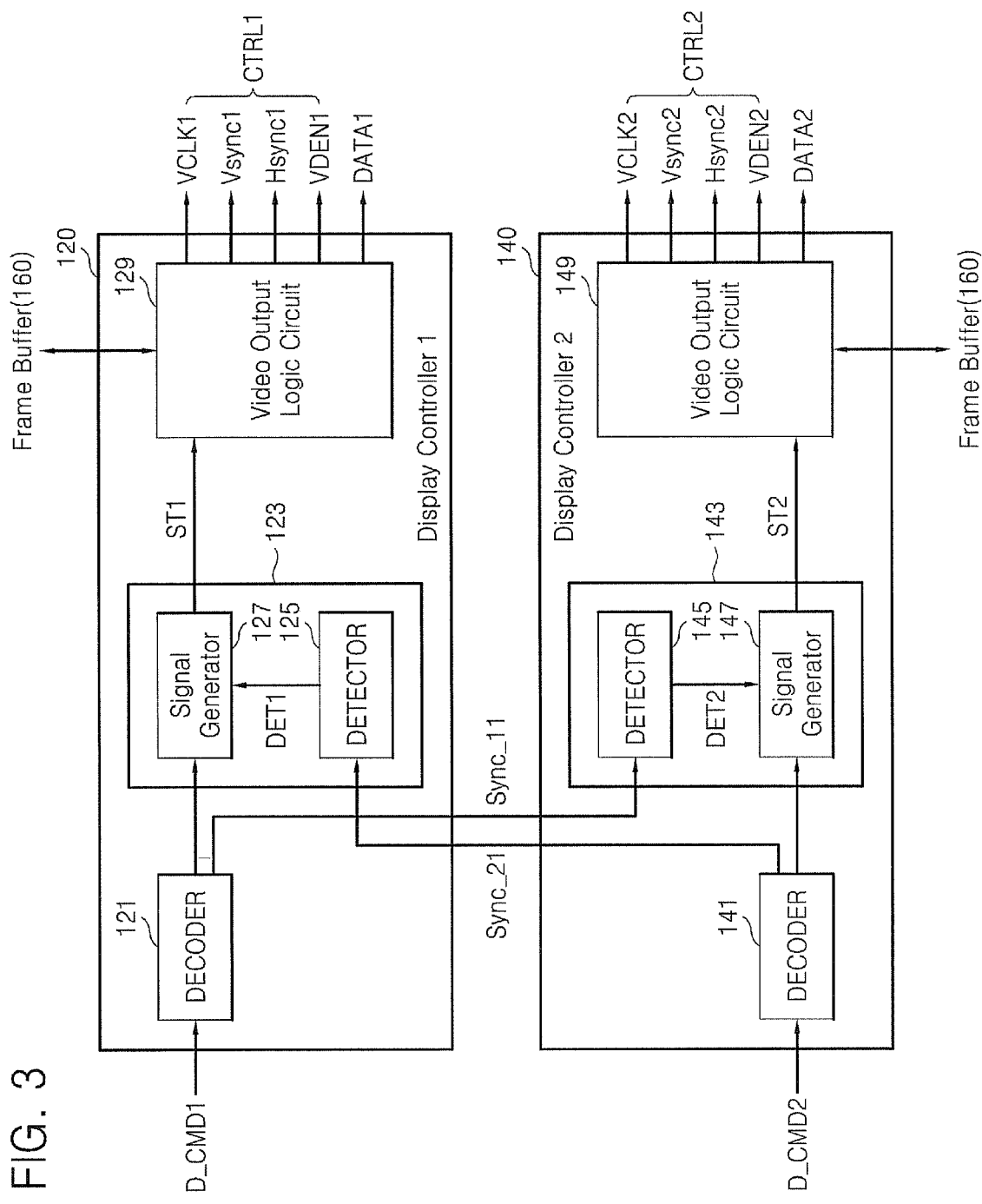
FIG. 3 shows an example embodiment of a detailed block diagram of a plurality of display controllers illustrated in FIG. 1 or 2.
Figure 4:
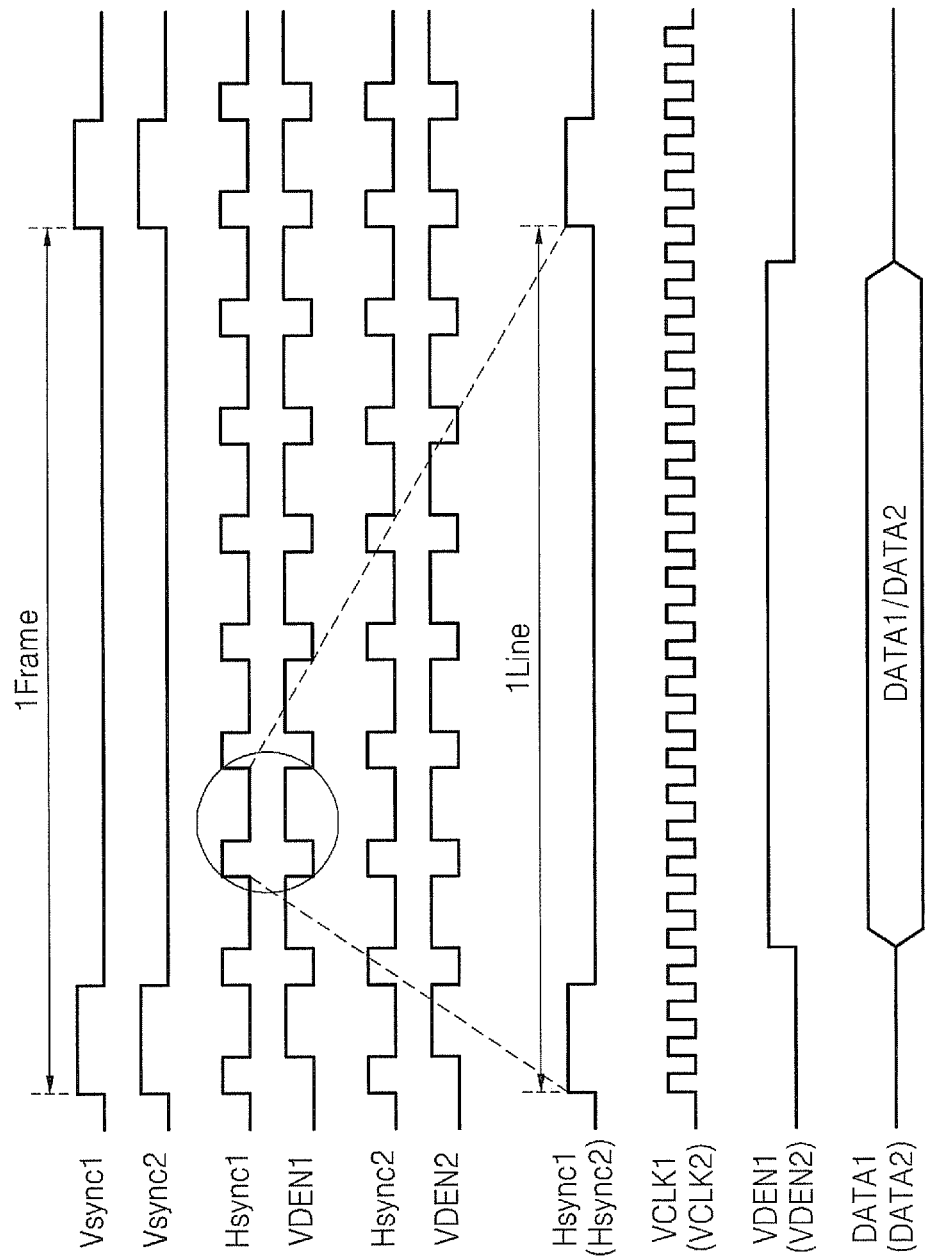
FIG. 4 shows a timing diagram of a plurality of timing control signals output from the plurality of display controllers illustrated in FIG. 1 or 2.

FIG. 3 shows an example embodiment of a detailed block diagram of a plurality of display controllers illustrated in FIG. 1 or 2, FIG. 4 shows a timing diagram of a plurality of timing control signals output from the plurality of display controllers illustrated in FIG. 1 or 2, FIG. 8 shows video data displayed on two displays according to a line split mode, and FIG. 9 shows video data displayed on two displays according to a frame split mode.

An operation of a display system 100A or 100B may be explained in detail as follows referring to FIGS. 1 to 4, 8, and 9.

The CPU 110 of FIG. 1 receives a display mode change command IST and generates a first display command D_CMD1 and a second display command D_CMD2 according to a received display mode change command IST. A first CPU 110-1 and a second CPU 110-2 of FIG. 2 receive a display mode change command IST and generate each of a first display command D_CMD1 and a second display command D_CMD2 according to the received display mode change command IST, respectively.

When the first display command D_CMD1 is generated prior to the second display command D_CMD2, an operation of a display system 100A or 100B is explained as follows.

A first decoder 121 of the first display controller 120 decodes a received first display command D_CMD1 and outputs a first decoding signal to a first control circuit 123, e.g., a first signal generator 127. When the first decoder 121 receives the first display command D_CMD1, the first decoder 121 outputs a first synchronizing information Sync_11 indicating that the first display command D_CMD1 is received, to a second control circuit 143 of the second display controller 140, e.g., a second detector 145.

The second detector 145 detects if the first synchronizing information Sync_11 is received and outputs a second detection signal DET2 to a second signal generator 147. Afterwards, a second decoder 141 of the second display controller 140 decodes a received second display command D_CMD2 and outputs a second decoding signal to the second control circuit 143, e.g., the second signal generator 147.

When the second decoder 141 receives the second display command D_CMD2, the second decoder 141 outputs a second synchronizing information Sync_21 indicating that the second display command D_CMD2 is received, to a first control circuit 123 of the first display controller 120, e.g., a first detector 125.

The first detector 125 detects if the second synchronizing signal Sync_21 is received and outputs a first detection signal DET1 to the first signal generator 127. Accordingly, the first signal generator 127 generates a first control signal ST1 according to a first decoding signal output from the first decoder 121 and a first detection signal DET1. That is, the first control circuit 123 receiving the first decoding signal output from the first decoder 121 may generate the first control signal ST1 just after detecting a second synchronizing signal Sync_21.

The first video output logic circuit 129 generates a first video clock signal VCLK1, a first vertical synchronizing signal Vsync1, a first horizontal synchronizing signal Hsync1 and a first data enable signal VDEN1 in response to the first control signal ST1, and transmits first video data DATA1, stored in a frame buffer 160, with generated first timing control signals VCLK1, Vsync1, Hsync1 and VDEN1 to the first display 130.

A second signal generator 147 generates a second control signal ST2 according to a second decoding signal output from a second decoder 141 and a second detection signal DET2. That is, a second control circuit 143 receiving a first synchronizing signal Sync_11 may generate the second control signal ST2 just after receiving the second display command D_CMD2.

A second video output logic circuit 149 generates a second video clock signal VCLK2, a second vertical synchronizing signal Vsync2, a second horizontal synchronizing signal Hsync2 and a second data enable signal VDEN2 in response to the second control signal ST2, and transmits a second video data DATA2, stored in the frame buffer 160, with generated second timing control signals VCLK2, Vsync2, Hsync2 and VDEN2 to the second display 150.

As illustrated in FIG. 4, a timing, e.g., a start time-point, of the first video clock signal VCLK1 corresponds with a timing of the second video clock signal VCLK2; a timing, e.g., a start time point, of the first vertical synchronizing signal Vsync1 corresponds with a timing of the second vertical synchronizing signal Vsync2; a timing, e.g., a start time point, of the first horizontal synchronizing signal Hsync1 corresponds with a timing of the second horizontal synchronizing signal Hsync2; and a timing, e.g., a start time point, of the first data enable signal VDEN1 corresponds with a timing of the second data enable signal VDEN2.

Each vertical synchronizing signal Vsync1 or Vsync2 is a signal for controlling a start and an end of a frame, each horizontal synchronizing signal Hsync1 or Hsync2 is a signal for controlling a start and an end of a line, and each data enable signal VDEN1 or VDEN2 is a signal for indicating validity of each video data DATA1 or DATA2. Each video data DATA1 or DATA2 is displayed on each display 130 or 150 according to each video clock signal VCLK1 or VCLK2.

Here, corresponding means timing control signals composing a pair, e.g., VCLK1 and VCLK2, Vsync1 and Vsync2, Hsync1 and Hsync2, and VDEN1 and VDEN2, may have a completely equal frequency and phase to each other, or means they have an equal frequency and phase to each other within a tolerance range defined in advance.

The first display 130 may display the first video data DATA1 as a frame according to a plurality of first timing control signals VCLK1, Vsync1, Hsync1 and VDEN1, and the second display 150 may display the second video data DATA2 as a frame according to a plurality of second timing control signals VCLK2, Vsync2, Hsync2 and VDEN2.

Accordingly, although video data, e.g., A, corresponding to a frame stored in the frame buffer 160 is separated and displayed on two displays 130 and 150 according to a line split mode as illustrated in FIG. 8, the display system 100A or 100B may display a corresponding video image as if it is displayed on one display. Also, although video data, e.g., A, corresponding to a frame stored in the frame buffer 160 is separated and displayed on two displays 130 and 150 according to a frame split mode as illustrated in FIG. 9, the display system 100A or 100B may display a corresponding video image as if it is displayed on one display.

Each display 130 or 150 may be embodied as a flat display such as a TFT-LCD, LED or OLED. According to embodiments, each decoder 121 or 141 may be embodied in a Special Function Register (SFR).

Each detector 125 or 145 may also be embodied in a register storing a flag. Here, each synchronizing signal Sync_11 or Sync_21 may be a K-bit flag, where K is a natural number. Subsequently, each decoder 121 or 141 may generate each flag Sync_11 or Sync_21 in response to each display command D_CMD1 or D_CMD2, and each flag Sync_11 or Sync_21 may be stored in each register 123 or 143.

For example, each decoder 121 or 141 may set each flag Sync_11 or Sync_21 to 1 in response to each display command D_CMD1 or D_CMD2.

Continuously, when the second display command D_CMD2 is generated prior to the first display command D_CMD1, an operation of the display system 100A or 100B is explained as follows referring to FIGS. 1 to 4, 8, and 9.

The second decoder 141 decodes a received second display command D_CMD2, outputs a second decoding signal to a second control circuit 143, e.g., a second signal generator 147, and transmits a second synchronizing information Sync_2X=Sync_21, indicating that the second display command D_CMD2 is received, to a first control circuit 123 of a first display controller 120, e.g., a first detector 125. Accordingly, the first detector 125 detects if the second synchronizing information Sync_21 is received and outputs a first detection signal DET1 to a first signal generator 127.

Later, the first decoder 121 decodes a received first display command D_CMD1, outputs a first decoding signal to the first control circuit 123, e.g., the first signal generator 127, and transmits a first synchronizing information Sync_1X=Sync_11, indicating that the first display command D_CMD1 is received, to a second control circuit 143 of a second display controller 140, e.g., a second detector 155. Accordingly, the second detector 155 detects if the first synchronizing information Sync_11 is received and outputs a second detection signal DET2 to a second signal generator 147.

Here, the first control circuit 123 outputs a first control signal ST1 to a first video output logic circuit 129 in response to a first display command D_CMD1 and a first detection signal. DET1, and the second control circuit 143 outputs a second control signal ST2 to a second video output logic circuit 149 in response to a second display command D_CMD2 and a second detection signal DET2.

According to embodiments, an output time-point of the first control signal ST1 output from the first control circuit 123 and an output time-point of the second control signal ST2 output from the second control circuit 143 may correspond to each other or correspond to each other within a tolerance range according to a design specification.

Each timing, e.g., an output time-point, of a plurality of first timing control signals VCLK1, Vsync1, Hsync1 and VDEN1 and each timing, e.g., an output time-point, of a plurality of second timing control signals VCLK2, Vsync2, Hsync2 and VDEN2 may correspond to each other or correspond to each other within the tolerance range according to a design specification.

Figure 5:
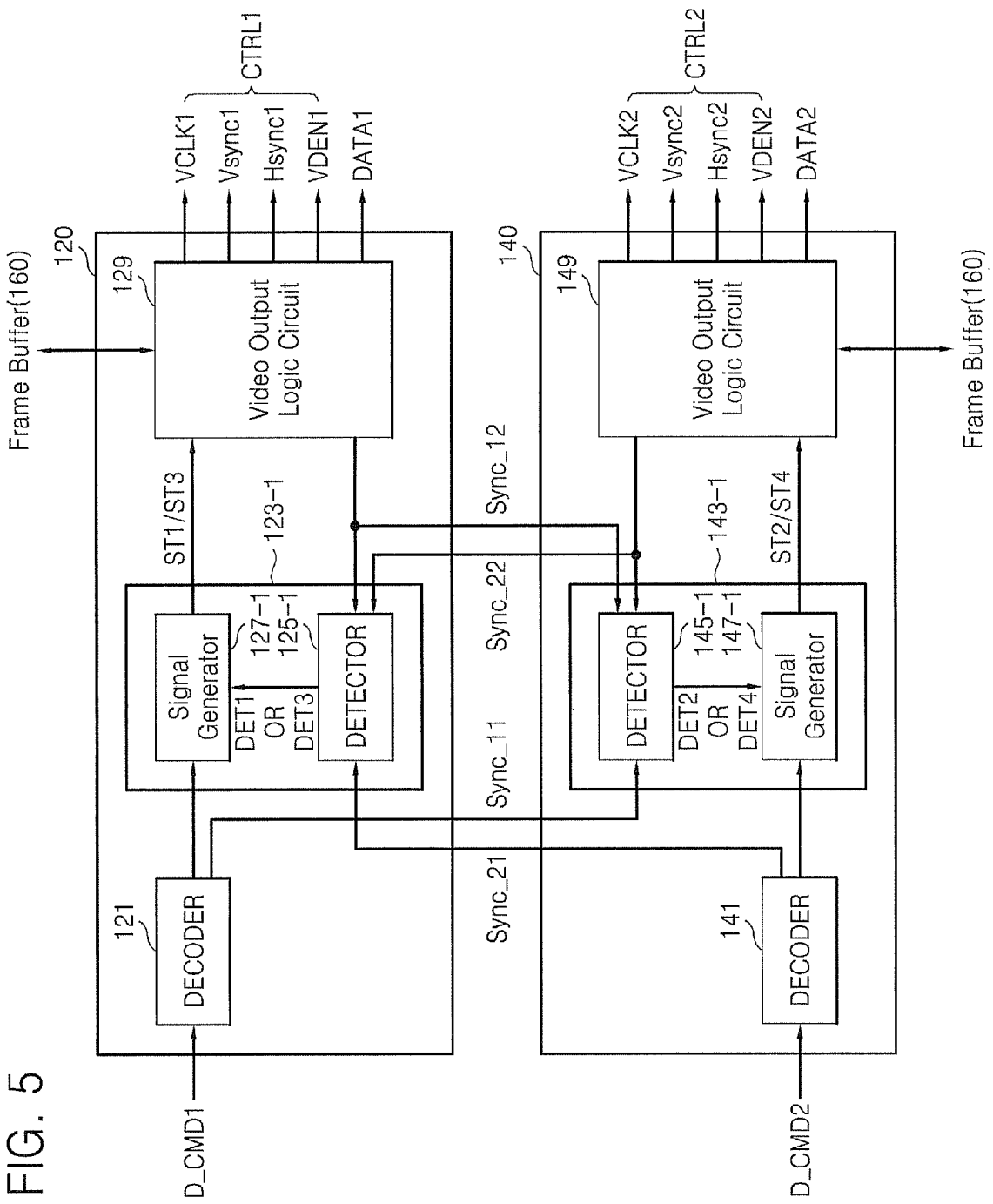
FIG. 5 shows another example embodiment of a detailed block diagram of the plurality of display controllers illustrated in FIG. 1 or 2.

FIG. 5 shows another example embodiment of a detailed block diagram of the plurality of display controllers illustrated in FIG. 1 or 2. While each of the plurality of display controllers 120 and 140 illustrated in FIG. 5 performs a multi-display operation according to a display mode change command IST, a timing of at least one of a plurality of first timing control signals CTRL1 controlling a display of the first video data DATA1 and a timing of at least one of a plurality of second timing control signals CTRL2 controlling a display of the second video data DATA2 may be made to correspond or synchronize to each other.

Referring to FIG. 5, a first display controller 120 includes a first decoder 121, a first control circuit 123-1 and a first video output logic circuit 129.

The first decoder 121 decodes a received first display command D_CMD1 and outputs a first decoding signal to a first control circuit 123-1, e.g., a first signal generator 127-1. The first control circuit 123-1 outputs a third control signal ST3 to the first video output logic circuit 129 based on the first decoding signal and a second synchronizing information Sync_22 which is output from a second display controller 140. Here, the second synchronizing information Sync_22 includes information of at least one of the plurality of second timing control signals CTRL2, i.e., a second video clock signals VCLK2, a second vertical synchronizing signal Vsync2, a second horizontal synchronizing signal Hsync2 and a second data enable signal VDEN2.

A first detector 125-1 compares the first synchronizing information Sync_12 with the second synchronizing information Sync_22 and transmits a third detection signal DET3 to a first signal generator 127-1. The first signal generator 127-1 outputs a third control signal ST3 to the first video output logic circuit 129 in response to a third detection signal DET3.

In response to the third control signal ST3, the first video output logic circuit 129 controls a timing, e.g., a start time-point of rising edge or falling edge, of at least one of a plurality of first timing control signals CTRL1, i.e., a first video clock signal VCLK1, a first vertical synchronizing signal Vsync1, a first horizontal synchronizing signal Hsync1 and a first data enable signal VDEN1.

The second display controller 140 includes a second decoder 141, a second control circuit 143-1 and a second video output logic circuit 149. The second decoder 141 decodes a received second display command D_CMD2 and outputs a second decoding signal to the second control circuit 143-1, e.g., a second signal generator 147-1. The second control circuit 143-1 outputs a fourth control signal ST4 to the second video output logic circuit 149 according to the second decoding signal and a first synchronizing information Sync_12 output from the first display controller 120. The first synchronizing information Sync_12 includes information for at least one of the plurality of first timing control signals CTRL1.

The second detector 145-1 compares the first synchronizing information Sync_12 with the second synchronizing information Sync_22 and transmits a fourth detection signal DET4 to the second signal generator 147-1. The second signal generator 147-1 outputs the fourth control signal ST4 to the second video output logic circuit 149 in response to the fourth detection signal DET4. In response to the fourth control signal ST4, the second video output logic circuit 149 controls a timing of at least one of the plurality of second timing control signals CTRL1 in response to the fourth control signal ST4. Each control circuit 123-1 and 143-1, by using a signal, e.g., each horizontal synchronizing signal Hsync1 or Hsync2, showing pixel information displayed on each display 130 or 150, may correct the pixel information displayed on each of the display 130 and 150.

Figure 6:
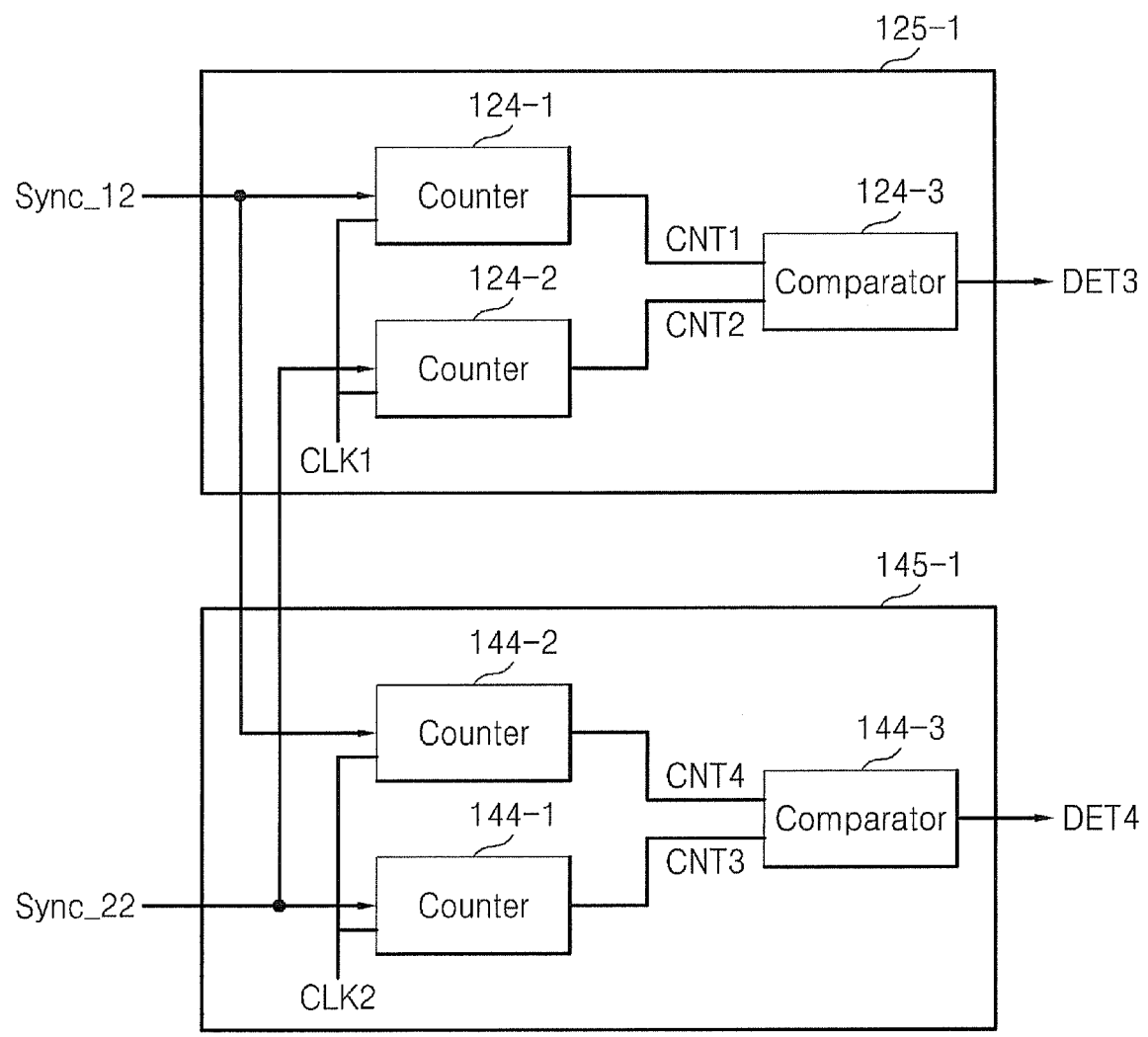
FIG. 6 shows a detailed block diagram of a plurality of detectors illustrated in FIG. 5.
Figure 7:
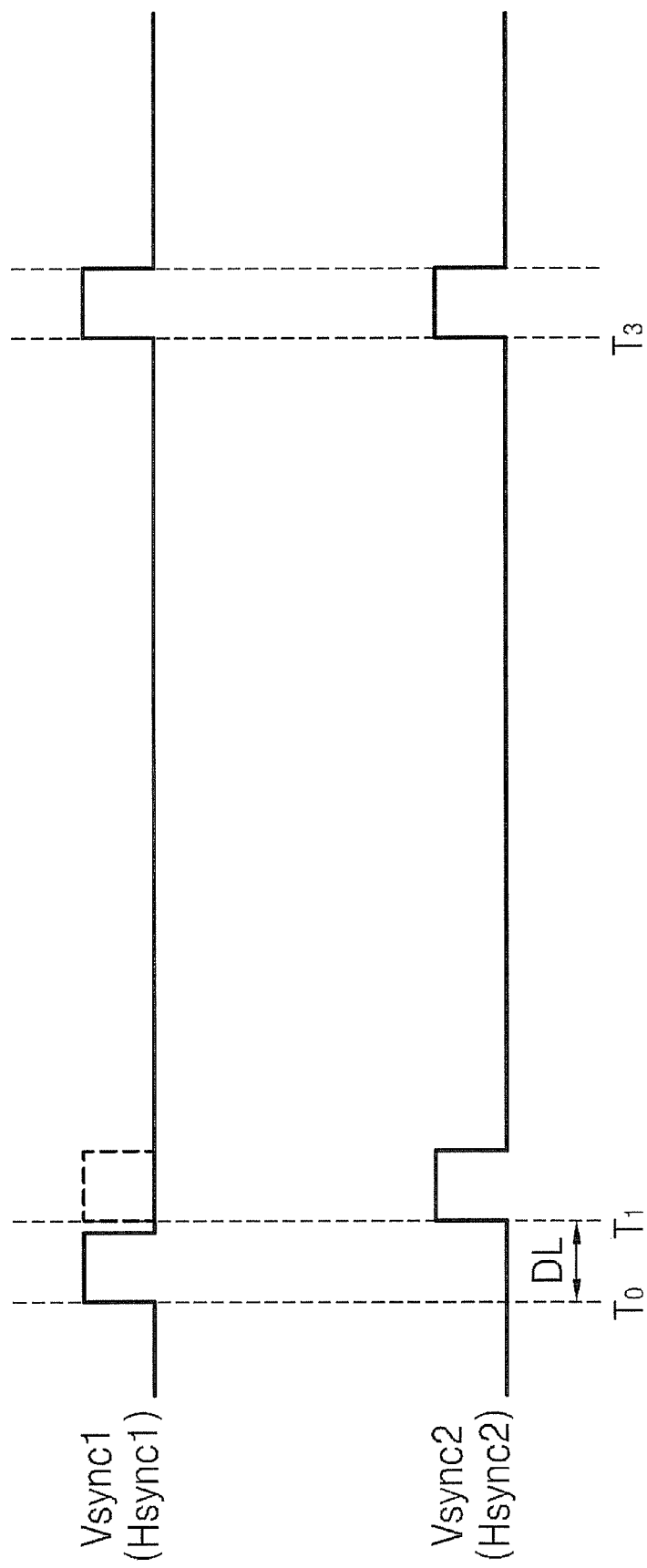
FIG. 7 shows a timing diagram of a timing control signal output from a plurality of display controllers illustrated in FIG. 5.

FIG. 6 shows a detailed block diagram of a plurality of detectors illustrated in FIG. 5, and FIG. 7 shows a timing diagram of a timing control signal output from the plurality of display controllers illustrated in FIG. 5. Referring to FIGS. 5 to 7, a method by which each display controller 120 or 140 controls or synchronizes a timing of each vertical synchronizing signal Vsync1 or Vsync2 is explained as follows.

First of all, it is assumed that the first synchronizing information Sync_12 is information for a first vertical synchronizing signal Vsync1 and the second synchronizing information Sync_22 is information for a second vertical synchronizing signal Vsync2.

While a multi-display operation is performed, each detector 125-1 or 145-1 compares the first synchronizing information Sync_12 with the second synchronizing information Sync22 and outputs each detection signal DET3 or DET4.

The first detector 125-1 includes a first counter 124-1, a second counter 124-2 and a first comparator 124-3.

The first counter 124-1 counts the first synchronizing information Sync_12, e.g., the first vertical synchronizing signal Vsync1, in response to a first counter clock signal CLK1. For example, the first counter 124-1 may count a first time from a first time-point T0 to a second time-point T1, which is a rising edge of the first vertical synchronizing signal Vsync1, and output a first count value CNT1 corresponding to the first time.

The second counter 124-2 counts second synchronizing information Sync_22, e.g., a second vertical synchronizing signal Vsync2, in response to the first counter clock signal CLK1 and outputs a second count value CNT2. For example, the second counter 124-2 may count a second time from the first time-point T0 to a second time-point T1, which is a rising edge of the second vertical synchronizing signal Vsync2, and output a second count value CNT2 corresponding to the second time.

The first comparator 124-3 compares the first count value CNT1 with the second count value CNT2 and outputs a third detection signal DET3 corresponding to a comparison result. The third detection signal DET3 includes information of a time difference DL between the second time-point T1 and the first time-point T0.

The second detector 145-1 includes a third counter 144-1, a fourth counter 144-2 and a second comparator 144-3.

The third counter 144-1 counts a second synchronizing information Sync_22, e.g., a second vertical synchronizing signal Vsync2, in response to a second counter clock signal CLK2 synchronized to the first counter clock signal CLK1 and outputs a third count value CNT3. For example, the third counter 144-1 may count a second time between a first time-point T0 and a second time-point T1, which is a rising edge of the second vertical synchronizing signal Vsync2, and output a third count value CNT3 corresponding to the second time. The fourth counter 144-2 counts a second synchronizing information Sync_12, e.g., a first vertical synchronizing signal Vsync2, in response to a second counter clock signal CLK2 and outputs a fourth count value CNT4. For example, the fourth counter 144-2 may count a first time between a first time-point T0 and a first time-point T1, which is a rising edge of the first vertical synchronizing signal Vsync1, and output a fourth count value CNT4 corresponding to the first time.

The second comparator 144-3 compares the third count value CNT3 with the fourth count value CNT4, and outputs a fourth detection signal DET4 corresponding to a comparison result. The fourth detection signal DET4 includes information of a time difference DL between the second time-point T1 and the first time-point T0. Accordingly, the first signal generator 127-1 generates a third control signal ST3 according to the third detection signal DET3, and the second signal generator 147-1 generates a fourth control signal ST4 according to the fourth detection signal DET4

As illustrated in FIG. 7, the first video output logic circuit 129 may control a timing, e.g., an occurrence time-point of the first vertical synchronizing signal Vsync1 according to the third control signal ST3. As the occurrence time-point of the first vertical synchronizing signal Vsync1 is controlled, the first video output logic circuit 129 may control each timing of a plurality of first timing control signals Hsync1, VCLK1 and VDEN1 except for the first vertical synchronizing signal Vsync1. Accordingly, vertical synchronizing signal Vsync1 or Vsync2 synchronized to each other may be transmitted with each data DATA1 or DATA2 to each display 130 or 150 at a third time-point T3 of FIG. 7, respectively.

Accordingly, a timing of each of the plurality of first timing signals CTRL1 and a timing of each of the plurality of second timing signals CTRL2 may be synchronized as illustrated in FIG. 4.

In addition, when the first synchronizing information Sync_12 is a first horizontal synchronizing signal Hsync1 and the second synchronizing information Sync_22 is a second horizontal synchronizing signal Hsync2, the first control circuit 123-1 and the second control circuit 143-1 may correspond or synchronize a timing of the first horizontal synchronizing signal Hsync1 and a timing of the second horizontal synchronizing signal Hsync2, respectively. Subsequently, each of the horizontal synchronizing signals Hsync1 and Hsync2 synchronized to each other may be transmitted with each data DATA1 or DATA2 to each display 130 or 150.

Moreover, when the first synchronizing information Sync_12 is a first data enable signal VDEN1 and the second synchronizing information Sync_22 is a second data enable signal VDEN2, the first control circuits 123-1 and the second control circuit 143-1 may correspond or synchronize timing of the first data enable signal VDEN1 to timing of the second data enable signal VDEN2, respectively. Additionally, when the first synchronizing information Sync_12 is a first video clock signal VCLK1 and the second synchronizing information Sync_22 is a second video clock signal VCLK2, the first control circuit 123-1 and the second control circuit 143-1 may correspond or synchronize timing of the first video clock signal VCLK1 and timing of the second video clock signal VCLK2, respectively.

As explained referring to FIGS. 5 to 7, each display controller 120 or 140 may synchronize a timing of each of timing control signals, e.g., Vsync1 and Vsync2, Hsync1 and Hsync2, VCLK1 and VCLK2, and VDEN1 and VDEN2, which may compose a pair controlling a display of each video data DATA1 or DATA2 even while a multi-display operation is performed.

Figure 10:
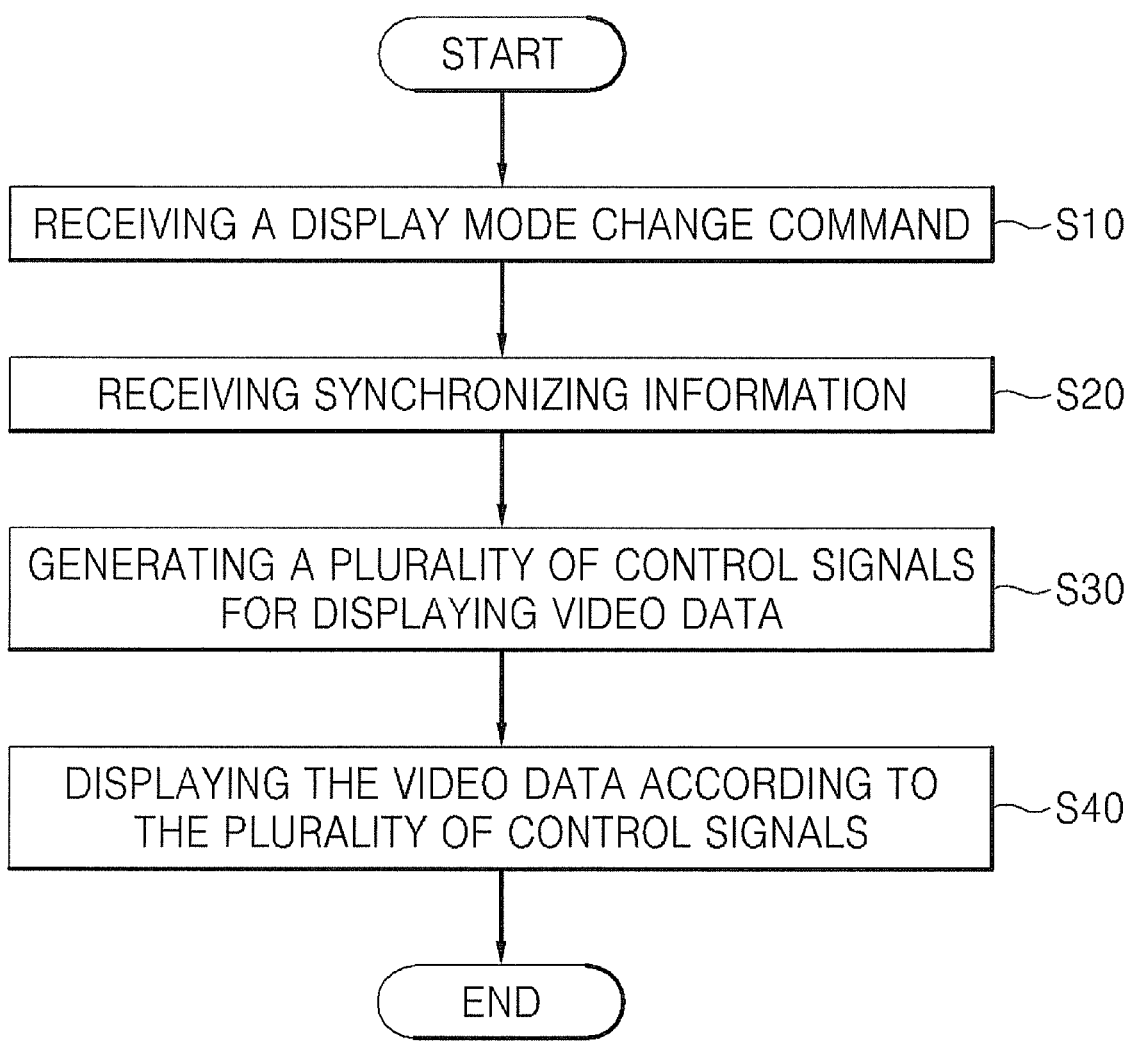
FIG. 10 is a flowchart for explaining an operation of a display system, including a plurality of display controllers as illustrated in FIG. 3.

FIG. 10 is a flowchart for explaining an operation of a display system including a plurality of display controllers illustrated in FIG. 3. Referring to FIGS. 1 to 4, and 10, a CPU 110 receives a display mode change command IST (S10) and subsequently generates a first display command D_CMD1 and a second display command D_CMD2 at a desired (or, alternatively a predetermined) interval.

Each decoder 121 or 141 generates each decoding signal in response to each display command D_CMD1 or D_CMD2. Additionally, when each display command D_CMD1 or D_CMD2 is received, each decoder 121 or 141 generates each synchronizing information Sync_11 or Sync_21 indicating each of the display commands D_CMD1 and D_CMD2 is received. Each control circuit 123 or 143 receives each decoding signal and each synchronizing information Sync_11 or Sync_21 (S20). Each of the control circuits 123 and 143 generates each control signal ST1 or ST2 as the respective decoding signal and each of the synchronizing information Sync_11 and Sync_21 are received.

A first video output logic circuit 129 generates a plurality of first timing control signals CTRL1 for displaying a first video data DATA1 on a first display 130 as illustrated in FIG. 8 or 9 in response to the first control signal ST1 (S30). In addition, a second video output logic circuit 149 generates a plurality of second timing control signals CTRL2 for displaying a second video data DATA2 on a second display 150 as illustrated in FIG. 8 or 9 in response to the second control signal ST2 (S30).

Here, each timing of the plurality of first timing control signals CTRL1 generated by the first video output logic circuit 129 is synchronized to each timing of the plurality of second timing control signals CTRL2 generated by the second video output logic circuit 149 as illustrated in FIG. 4. The first display 130 displays the first video data DATA1 as a frame according to the plurality of first timing control signal CTRL1, and the second display 150 displays the second video data DATA2 as a frame according to the plurality of second timing control signals CTRL2 (S40).

Figure 11:
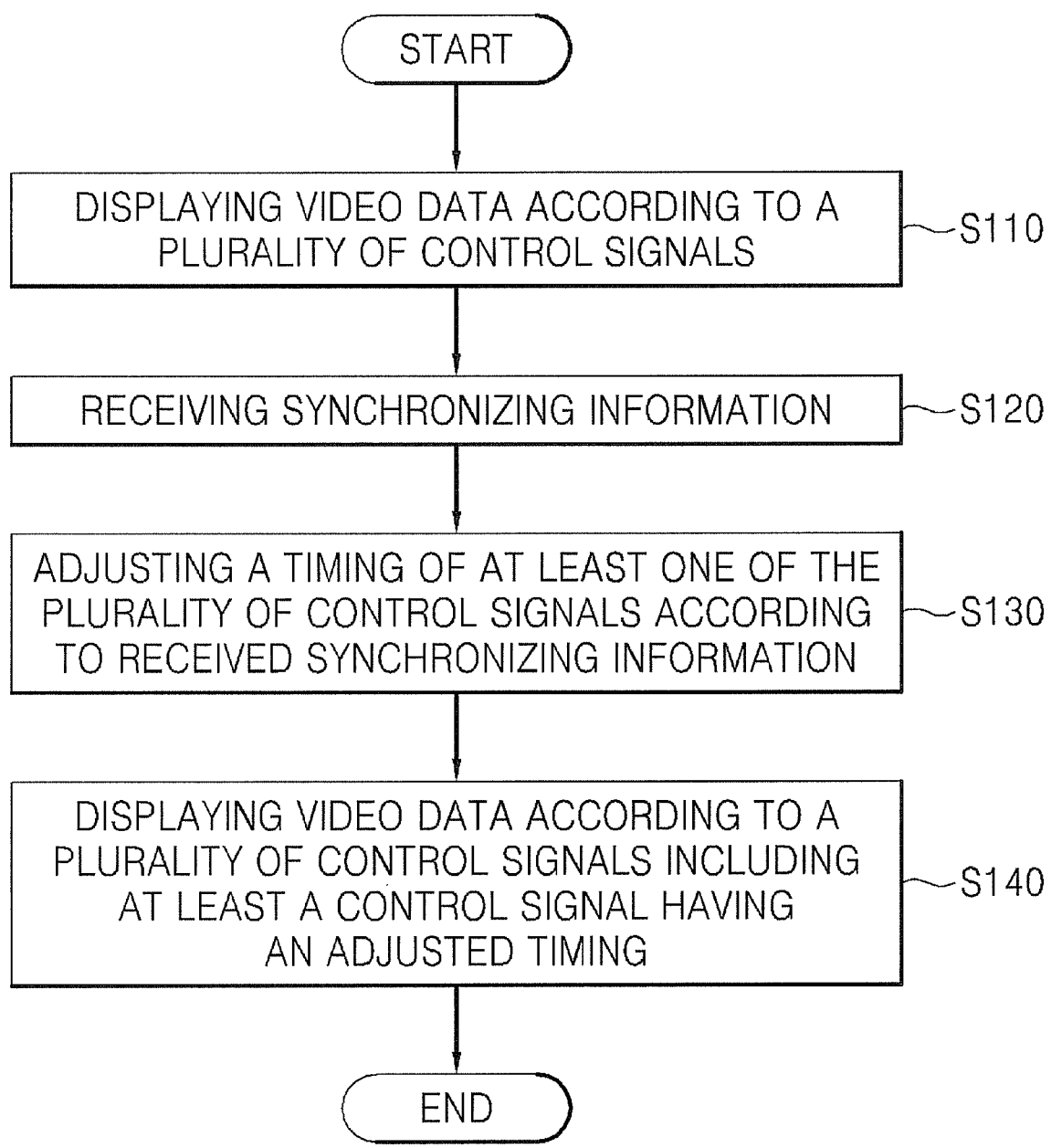
FIG. 11 is a flowchart for explaining an operation of a display system including a plurality of display controllers as illustrated in FIG. 5.

FIG. 11 is a flowchart for explaining an operation of a display system including a plurality of display controllers illustrated in FIG. 5. Referring to FIGS. 1, 2, 5 to 9, and 11, the first display 130 displays the first video data DATA1 as a frame according to the plurality of first timing control signals CTRL1, and the second display 150 displays the second video data DATA2 as a frame according to the plurality of second timing control signals CTRL2 while a multi-display operation is performed (S110).

Each detector 125-1 or 145-1 illustrated in FIG. 5 receives the first synchronizing information Sync_12, e.g., one of the plurality of first timing control signals CTRL1, and the second synchronizing information Sync_22, e.g., one of the plurality of second timing control signals CTRL2 (S120).

The first detector 125-1 compares a timing of one of the plurality of first timing control signals CTRL1, e.g., Vsync1, Hsync1, VCLK1 or VDEN1, with a timing of one of the plurality of second timing control signals CTRL2, e.g., Vsync2, Hsync2, VCLK2 or VDEN2, and outputs a third detection signal DET3 corresponding to a comparison result to a first signal generator 127-1. Here, the first signal generator 127-1 outputs a third control signal ST3 in response to the third detection signal DET3. The first video output logic circuit 129 adjusts a timing of at least one of the plurality of first timing control signals CTRL1 in response to the third control signal ST3 (S130).

At the same time, a second detector 145-1 compares a timing of one of the plurality of first timing control signals CTRL1, e.g., Vsync1, Hsync1, VCLK1 or VDEN1, with a timing of one of the plurality of second timing control signals CTRL2, e.g., Vsync2, Hsync2, VCLK2 or VDEN2, and outputs a fourth detection signal DET4 corresponding to a comparison result to a second signal generator 147-1. Here, the second signal generator 147-1 outputs a fourth control signal ST4 in response to the fourth detection signal DET4. The second video output logic circuit 149 adjusts a timing of at least one of the plurality of second timing control signals CTRL2 in response to the fourth control signal ST4 (S130).

Control signals, e.g., Vsync1 and Vsync2 or Hsync1 and Hsync2, having a timing adjusted by each video output logic circuit 129 or 149 are the same as illustrated in FIG. 7.

A first display 130 displays a first video data DATA1 as a frame according to a plurality of first timing control signals CTRL1 including at least one control signal having an adjusted timing, and a second display 150 displays a second video data DATA2 as a frame according to a plurality of second timing control signals CTRL2 including at least a control signal having an adjusted timing (S140).

Figure 12:
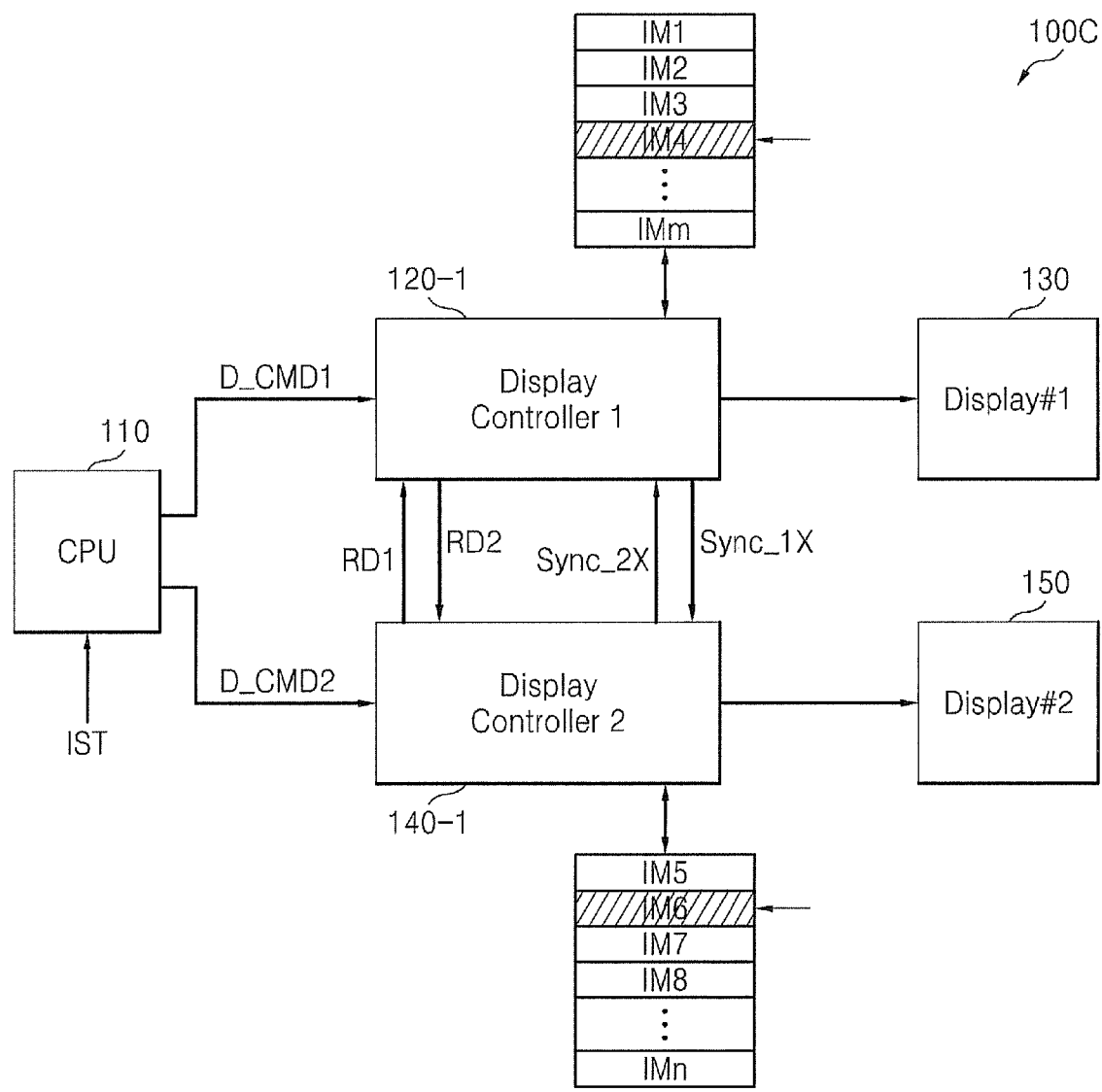
FIG. 12 shows a schematic block diagram of a display system according to still another example embodiment of the present invention.

FIG. 12 shows a schematic block diagram of a display system according to still another example embodiment of the present invention. Referring to FIG. 12, a display system 100C may perform a multi-display operation at a certain time-point. For example, if a display mode change command IST is input to a CPU 110 when the first display 130 displays a text data and the second display 150 displays a keyboard, the CPU 110 outputs a first display command D_CMD1 and a second display command D_CMD2.

A first display controller 120-1 outputs each video data IM1 to IMm successively to the first display 130, and a second display controller 140-1 outputs each video data IM5 to IMn successively to the second display 150. The first display controller 120-1 outputs a first ready command RD1 to the second display controller 140-1 in response to the first display command D_CMD1, and the second display controller 140-1 outputs a second ready command RD2 to the first display controller 120-1 in response to the second display command D_CMD2.

In this case, the second display controller 140-1 may set a frame IM6 as a target frame in response to the first ready command RD1, and the first display controller 120-1 may set a frame IM4 as a target frame in response to the second ready command RD2.

For example, when the first display controller 120-1 outputs a current frame IM1 to the first display 130 and the second display controller 140-1 outputs a current frame IM5 to the second display 150, the first display controller 120-1 may control a next output frame to jump to a frame IM4 so as to correspond or synchronize an output time-point of each of target frame IM4 and IM6 to each other. Accordingly, each display controller 120-1 or 140-1 may correspond or synchronize an output time-point of each of the target frame IM4 and IM6 by using each synchronizing information Sync_1X or Sync_2X.

As another example, when the first display controller 120-1 outputs a current frame IM1 to the first display 130 and the second display controller 140-1 outputs a current frame IM5 to the second display 150, the second display controller 140-1 may delay an output time-point of a target frame IM6 until the first display controller 120-1 outputs each frame IM2 or IM3 to the first display 130 so as to correspond or synchronize an output time point of each of the target frame IM4 and IM6 to each other. Accordingly, each of the display controller 120-1 and 140-1 may correspond or synchronize an output time-pint of each of the target frame IM4 and IM6 by using each synchronizing information Sync_1X or Sync_2X.

Figure 13:
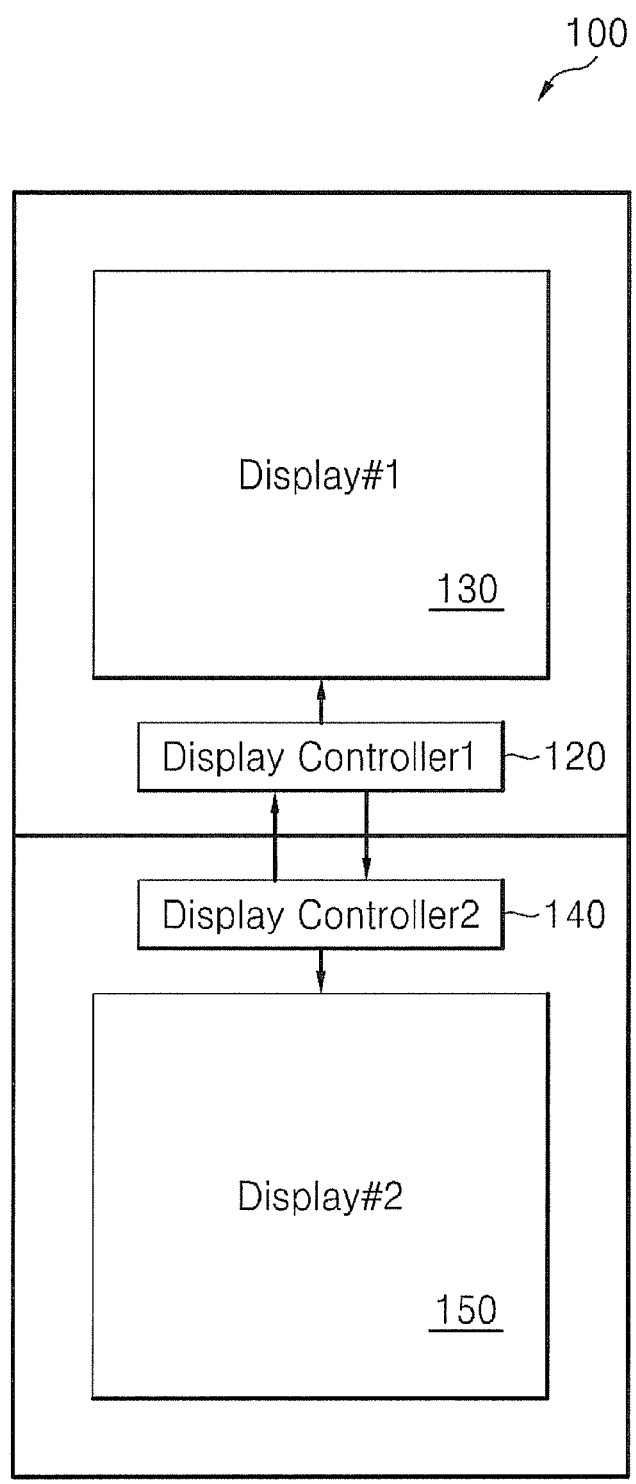
FIG. 13 shows a schematic block diagram of a display system according to still another example embodiment of the present invention.

FIG. 13 shows a schematic block diagram of a display system according to still another example embodiment of the present invention. A display system 100 may be a cellular phone or a game console including two displays 130 and 150.

Here, the display system 100 may be a general system including each display system 100A, 100B or 100C. In addition, the first display controller 120 may be the first display controller 120 or 120-1 illustrated in FIG. 1, 2 or 12, and the second display controller 140 may be the second display controller 140 or 140-1 illustrated in FIG. 1, 2 or 12.

Figure 14:
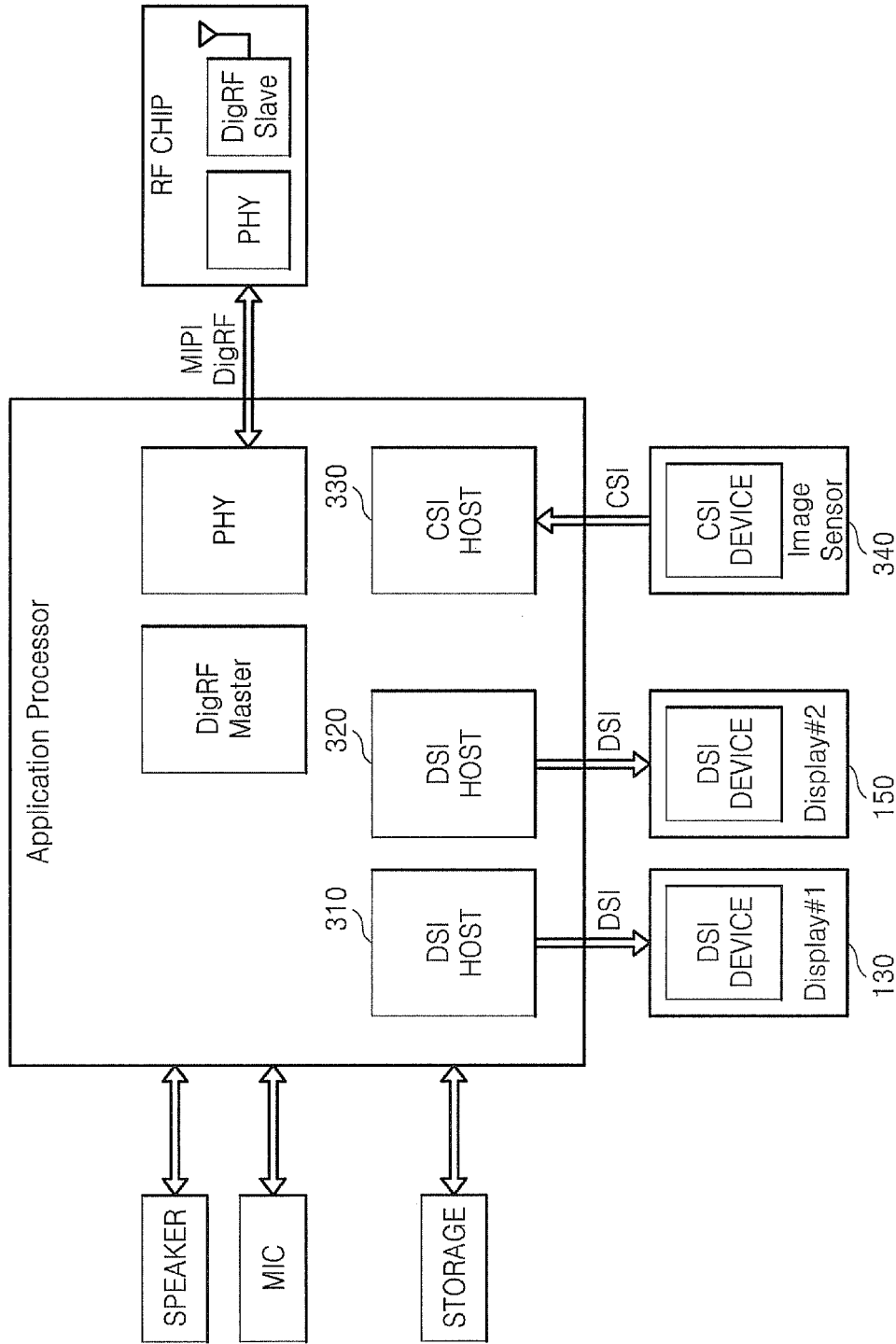
FIG. 14 shows a schematic block diagram of a display system according to still another example embodiment of the present invention.

FIG. 14 shows a schematic block diagram of a display system according to still another example embodiment of the present invention. Referring to FIG. 14, a display system 300 may be embodied as, for example, a cellular phone, a personal digital assistant (PDA), a portable multimedia player (PMP) or a smart phone, which may use or support a mobile industry processor interface (MIPI).

The display system 300 includes an application processor, two displays 130 and 150 and an image sensor 340. A CSI host 330 embodied in the application processor may perform a serial communication with a CSI device of the image sensor 340 through a camera serial interface (CSI). Each DSI host 310 or 320 embodied in the application processor may perform a serial communication with a DSI device of each display 130 or 150 through a display serial interface (DSI), and collectively operate according to any of the above described embodiments.

The display system 300 may further include a RF chip communicating with the application processor. A PHY of the display system 300 may exchange data with a PHY of the RF chip based on MIPI DigRF. The display system 300 may further include a storage, a mike and a speaker.

A data processing system according to an example embodiment of the present invention, when dividing video data output from a video source into plural video data and displaying the divided video data on each of a plurality of displays, may synchronize timing control signals supplied to each of the plurality of displays.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A display controller, comprising:
   a decoder configured to decode a first display command and output a decoding signal and first synchronizing information indicating the first display command is received;
   a control circuit configured to generate a first control signal based on second synchronizing information and the decoding signal, the second synchronizing information being output from a second display controller and indicating if a second display command is received; and
   a video output logic circuit configured to send a part of video data stored in a video source and a plurality of first timing control signals for displaying the part of the video data on a display based on the first control signal,
   wherein the control circuit is configured to generate a second control signal according to a result of comparing a start time-point of a first signal among the plurality of first timing control signals with a start time-point of a second signal among a plurality of second timing control signals generated by the second display controller, and the video output logic circuit is configured to control the start time-point of the first signal in response to the second control signal.

2. The display controller of claim 1, wherein each of the first signal and the second signal is one of a vertical synchronizing signal, a horizontal synchronizing signal, a data enable signal and a video clock signal.

3. A display system, comprising:
a first display controller configured to control an operation of a first display and output first synchronizing information indicating a first display command is received;
a second display controller configured to control an operation of a second display different from the first display and output second synchronizing information indicating a second display command is received; and
a video source configured to store the video data the video data corresponding to a frame,
wherein the first display controller is configured to output a plurality of first timing control signals for controlling an operation of the first display in response to the first display command and the second synchronizing information,
wherein the second display controller is configured to output a plurality of second timing control signals for controlling an operation of the second display in response to the second display command and the first synchronizing information,
the first display controller is configured to send the plurality of first timing control signals with the first part of the video data to the first display so as to display the first part of the video data as a frame on the first display,
the second display controller is configured to send the plurality of second timing control signals with the second part of the video data to the second display so as to display the second part of the video data as a frame on the second display, and
each of the first display controller and the second display controller is configured to compare a start time-point of a first signal among the plurality of first timing control signals with a start time-point of a second signal among the plurality of second timing control signals, and adjust a start time-point of the first signal and a start time-point of the second signal, respectively, according to the comparison result.

4. The display system of claim 3, wherein
the plurality of first timing control signals comprise a first vertical synchronizing signal or a first horizontal synchronizing signal,
wherein the plurality of second timing control signals comprise a second vertical synchronizing signal or a second horizontal synchronizing signal,
wherein the first vertical synchronizing signal and the second vertical synchronizing signal are synchronized to each other, and the first horizontal synchronizing signal and the second horizontal synchronizing signal are synchronized to each other.

5. The display system of claim 3, wherein
the first display controller includes,
a first decoder configured to decode the first display command and output a first decoding signal and the first synchronizing information;
a first detector configured to detect the second synchronizing information;
a first signal generator configured to output a first control signal in response to the first decoding signal and an output signal of the first detector; and
a first video output logic circuit configured to output a first part of video data stored in a video source and the plurality of first timing control signals to the first display in response to the first control signal,
the second display controller includes, a second decoder configured to decode the second display command and outputting a second decoding signal and the second synchronize information;
a second detector configured to detect the first synchronizing information;
a second signal generator configured to output a second control signal in response to the second decoding signal and an output signal of the second detector; and
a second video output logic circuit configured to output a second part of video data stored in the video source and the plurality of second timing control signals to the second display in response to the second control signal.

6. The display system of claim 5, wherein each of the first decoder and the second decoder is embodied in a Special Function Register (SFR).

7. The display system of claim 3, wherein each of the first signal and the second signal is one of a vertical synchronizing signal, a horizontal synchronizing signal, a data enable signal and a video clock signal.

8. The display system of claim 3, wherein
the first display controller includes:
a first detector configured to compare the start time-point of the first signal with the start time-point of the second signal and output a first detection signal;
a first video output logic circuit configured to control the a start time-point of the first signal in response to the first detection signal,
the second display controller includes,
a second detector configured to compare the start time-point of the first signal with the start time-point of the second signal and output a second detection signal, and
a second video output logic circuit configured to control the start time-point of the second signal in response to the second detection signal.

9. The display system of claim 8, wherein
the first detector includes,
a first counter configured to count till the start time-point of the first signal;
a second counter configured to count till the start time-point of the second signal; and
a first comparator configured to compare a count value of the first counter with a count value of the second counter and output the first detection signal corresponding to a comparison result,
the second detector includes,
a third counter configured to count till the start time-point of the second signal;
a fourth counter configured to count till the start time-point of the first signal;
a second comparator configured to compare a count value of the third counter with a count value of the fourth counter and outputting the second detection signal corresponding to a comparison result.

10. The display system of claim 3, wherein
a first video data displayed on the first display and a second video data displayed on second display constitute a single video image.

11. A display system, comprising:
a plurality of display controllers, each display controller configured to output synchronizing information and control operation of a corresponding display of a plurality of displays based on the synchronizing information output from at least one other of the display controllers, wherein the plurality of display controllers includes a first display controller and a second display controller and the plurality of displays includes a first display and a second display corresponding to the first and second display controllers, the first display controller is configured to output a plurality of first timing control signals for controlling an operation of the first display in response to a first display command and a second synchronizing information received from the second display controller, the second display controller is configured to output a plurality of second timing control signals for controlling an operation of the second display in response to a second display command and the first synchronizing information from the second display controller, the first display controller is configured to send the plurality of first timing control signals with a first part of the video data to the first display so as to display the first part of the video data as a frame on the first display, the second display controller is configured to send the plurality of second timing control signals with a second part of the video data to the second display so as to display the second part of the video data as a frame on the second display, and each of the first display controller and the second display controller is configured to compare a start time-point of a first signal among the plurality of first timing control signals with a start time-point of a second signal among the plurality of second timing control signals, and adjust a start time-point of the first signal and a start time-point of the second signal, respectively, according to the comparison result.

12. The system of claim 11, wherein each display controller is configured to receive a respective display command, and each display controller is configured to control operation of the corresponding display based on the synchronizing information output from at least one other of the display controllers and the received display command.

13. The system of claim 12, wherein each display controller is configured to generate the synchronizing information in response to the received display command.

14. The system of claim 13, wherein each display controller is configured to control operation of the corresponding display based on the synchronizing information output from at least one other of the display controllers.

15. The system of claim 13, wherein the display controllers are configured to control operation of the corresponding displays such that display of video data on the corresponding displays is synchronized.

16. The system of claim 15, further comprising:
a video source configured to store the video data,
wherein each display controller is configured to control operation of the corresponding display to display a part of the stored video data.

17. The system of claim 15, wherein each display controller is configured to synchronize at least one of a vertical synchronizing signal, a horizontal synchronizing signal, a data enable signal and a video clock signal.

18. The display system of claim 11, wherein
a plurality of video data displayed on the plurality of display constitutes a single video image.

* * * * *